Sept. 20, 1971  J. V. WESTBROOK  3,605,792
VALVE WITH LEAK COLLECTOR
Filed Oct. 31, 1969  3 Sheets-Sheet 1
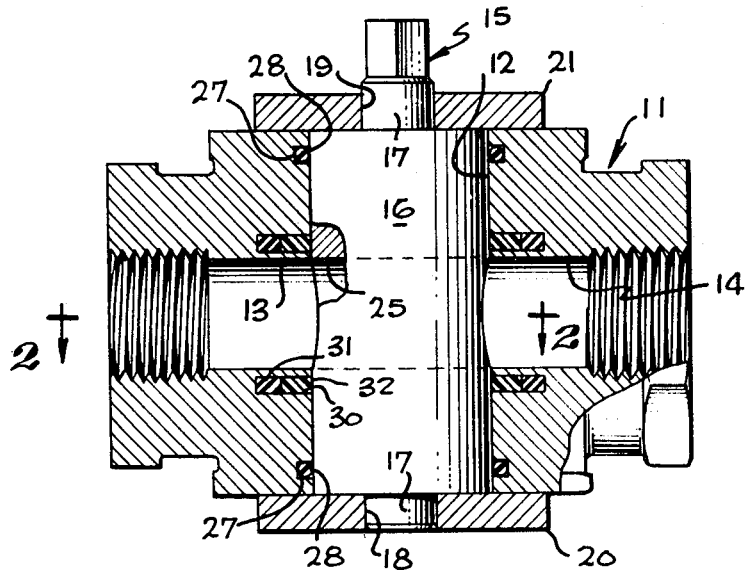
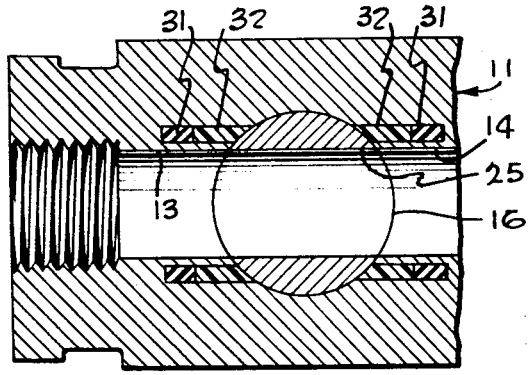
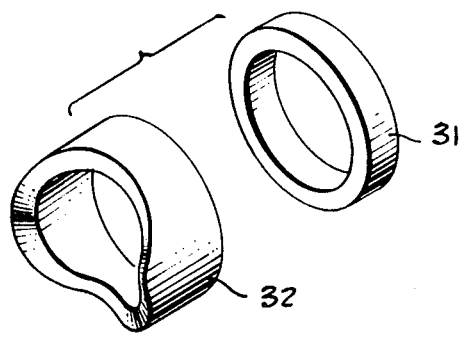
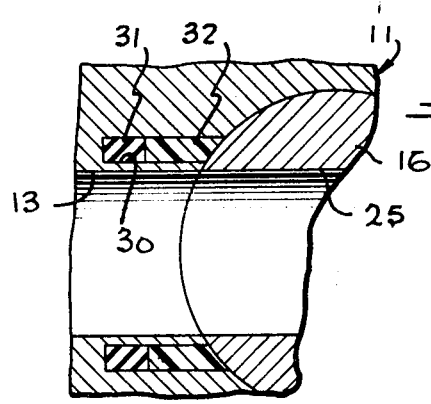
INVENTOR.
JAMES V. WESTBROOK
BY
Mason & Graham
ATTORNEYS

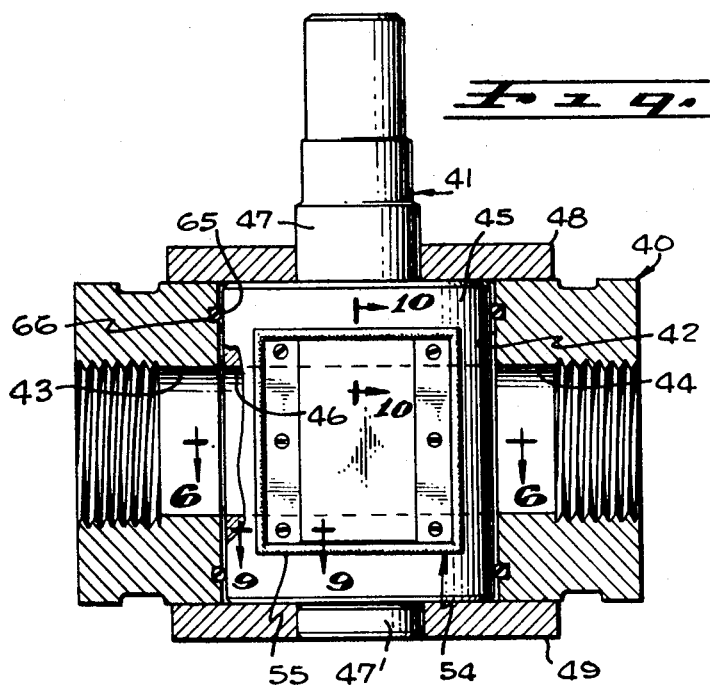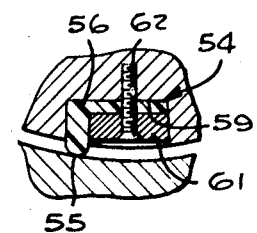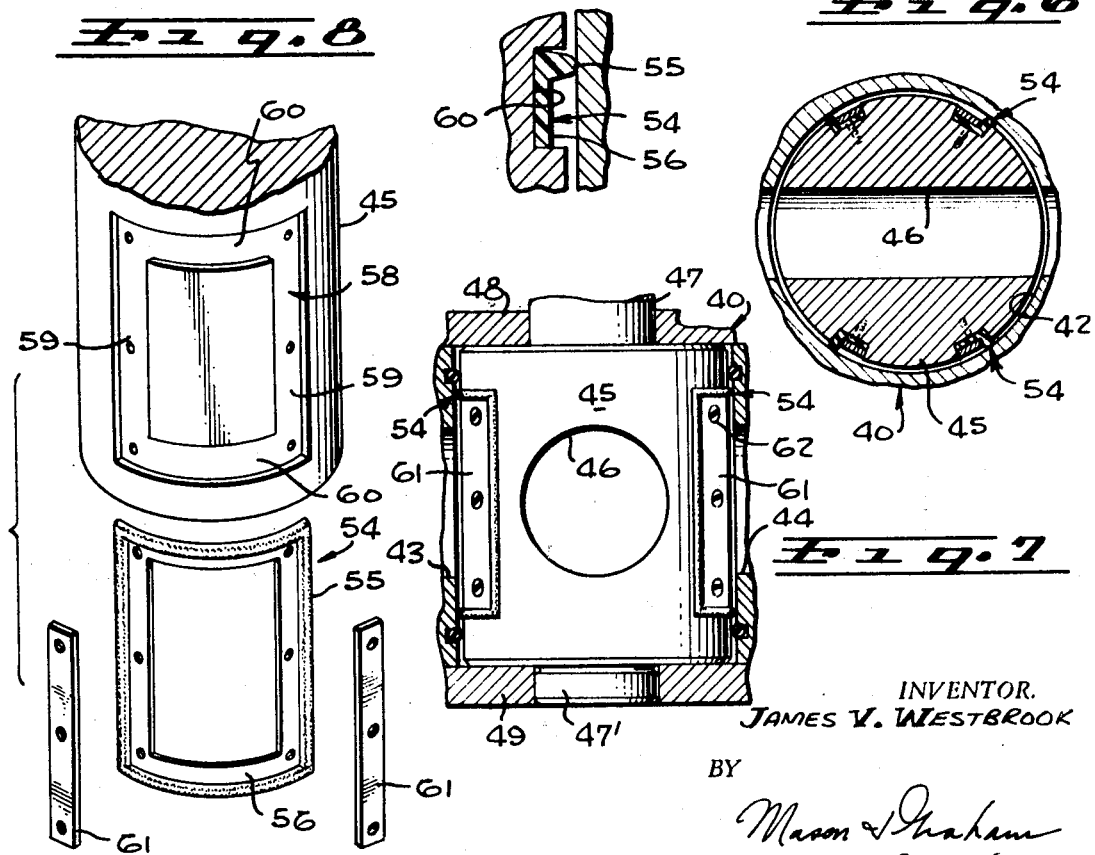

United States Patent Office 3,605,792
Patented Sept. 20, 1971

3,605,792
VALVE WITH LEAK COLLECTOR
James V. Westbrook, La Canada, Calif., assignor to Allied Industrial Components, Lynwood, Calif.
Filed Oct. 31, 1969, Ser. No. 872,834
Int. Cl. F16k 3/26
U.S. Cl. 137—312
3 Claims

ABSTRACT OF THE DISCLOSURE

A plug valve in which the valve body has a special seal ring assembly of a plastic seal ring and a resilient backup ring disposed around the inner ends of the fluid passage in the body where such passages intersect the central valve element receiving bore, the valve element being journaled in the body beyond the bore and beyond seal rings between the valve member and body. In another form a special rectangular seal is provided on each side of the valve member to close off the fluid passages in the valve body when the valve is closed.

---

The invention relates generally to valves and an object of the invention is to provide a novel, easily operable, leakproof plug valve which can be used for a variety of fluids including those which have heretofore caused great difficulty, such as various corrosive chemicals, latex, plastics and Carbex.

A further object is to provide a novel seal means between the valve member and the valve body in the region of the ports or passages in the body which provides an efficient seal between the body and valve member and permits a construction wherein there can be sufficient clearance between the valve member and body to permit of easy turning of the valve member in the body.

Another object is to provide a new and improved seal means carried by the valve member of a plug valve for effecting a seal between the valve member and the valve body when the valve is in closed position for use in a valve that is constructed with other seal means to prevent escape of fluid by migration thereof axially of the valve.

In summary it is an object to provide a resilient seal assembly in a valve body that engages the valve member to effect a seal therewith irrespective of whether the valve is open or closed. It is also an object to provide a plug type valve member with a seal means thereon for engaging the valve body when the valve is closed to seal off the passages in the body.

These and other objects will be apparent from the drawings and the following description. Referring to the drawings:

FIG. 1 is a central sectional elevational view of a valve embodying the invention;

FIG. 2 is a fragmentary sectional plan view on line 2—2 of FIG. 1;

FIG. 3 is an enlarged fragmentary sectional detail view in the plane of FIG. 2 but on a larger scale;

FIG. 4 is an isometric view of a seal assembly;

FIG. 5 is a central sectional elevational view of another valve embodying a modification;

FIG. 6 is a fragmentary sectional plan view on line 6—6 of FIG. 5;

FIG. 7 is a fragmentary view similar to FIG. 5 but showing the valve member in closed position;

FIG. 8 is a fragmentary exploded isometric view of one side of the valve element and the seal therefor;

Figure 11:
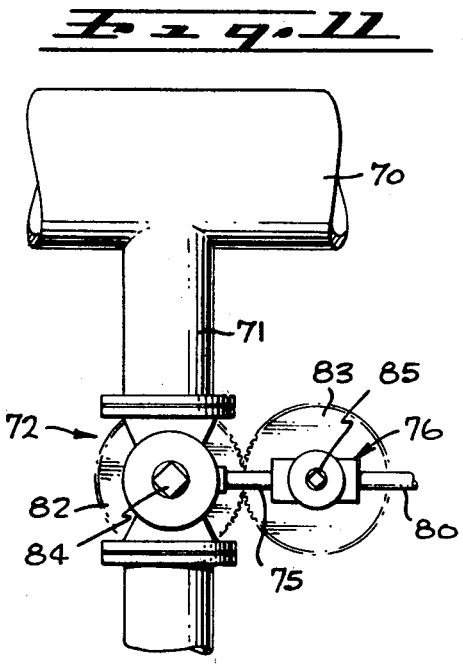

FIGS. 9 and 10 are fragmentary sectional views on lines 9—9 and 10—10, respectively, of FIG. 5, but on a larger scale;

FIG. 11 is a diagrammatic view of a pipe and valve assembly; and

Figure 12:
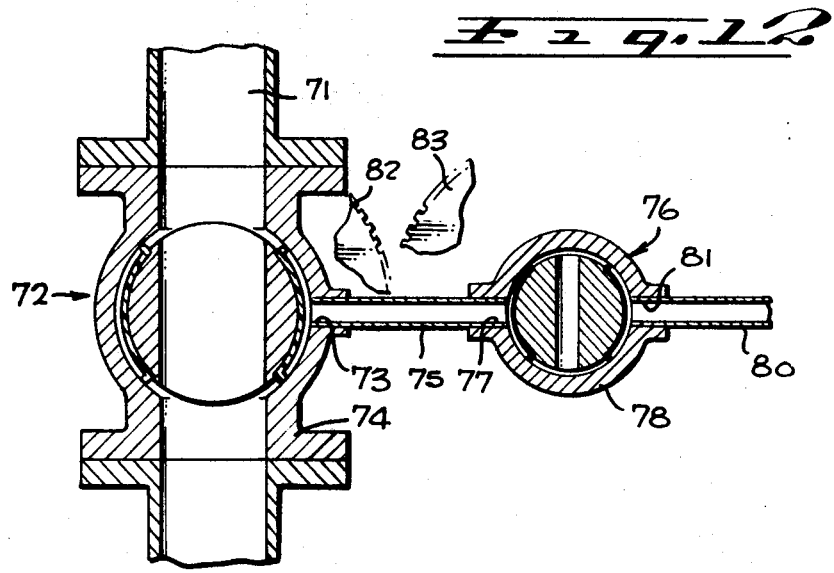

FIG. 12 is a diagrammatic sectional plan view of the assembly of FIG. 11.

More particularly describing the invention, referring first to FIGS. 1–4, numeral 11 designates a valve body shown as having a bore 12 therethrough which is intersected by an inlet passage 13 on one side and an outlet passage 14 diametrically opposite in registration therewith. A cylindrical plug valve member 15 having a cylindrical main section 16 is shown in the bore 12. This is provided with reduced end portions 17 that are journaled in bores 18 and 19 of a lower end plate 20 and an upper plate or cap 21, respectively, which are secured to the body by screws (not shown). Valve member 15 has a passage 25 therethrough which is designed to register with the inlet and outlet passages 13 and 14 of the body when the valve member is properly oriented, that is, turned to "open" position, as shown in FIG. 1.

To prevent escape of fluid axially of the valve member the valve body is provided with a pair of seal ring grooves designated 27 and each of these has a seal ring 28 therein that engages the valve element.

It is a feature of the invention that in order effectively to seal the valve member in the region of the inlet and outlet passages of the body, two special seal assemblies are provided, and to accommodate them, the body is formed with an annular groove 30 in the wall of the bore 12 around the inner end of each of the inlet and outlet passages. Each groove accommodates a seal ring assembly which includes a relatively resilient backup ring 31, which may be made of rubber, synthetic rubber or other suitable material, and an outer valve member engaging seal ring 32 which is preferably made of a suitable plastic such as Teflon. The shape of the inner ends of the rings 32 corresponds with the shape of the valve member where the ring engages the same as best shown in FIG. 4.

The valve body and valve member may be made of steel or other suitable metal, and, depending upon the fluid to be carried, all internal surfaces may be coated with a suitable material that is resistant to any corrosive action of the fluid. With the seal construction described the valve body may be made with sufficient clearance in the bore of the body (of the order of .006 of an inch on a side) to enable the valve member to be turned easily, the valve member being journaled in the end plates beyond the bore and beyond the seals 28 near the ends of the valve member. The resilient backup rings 31 serve to maintain the less resilient seal rings 32 in sealing engagement with the valve member.

Referring now to FIGS. 5–10, numeral 40 designates a valve body in which a valve member 41 of the plug valve type is received in a bore 42 formed in the body. Numeral 43 designates an inlet passage and 44 an outlet passage, the inner ends of which terminate at the bore 42. The valve member is shown as having a main cylindrical section 45 with a fluid passage 46 therethrough and reduced end sections 47 and 47' which are journaled in end plates 48 and 49 respectively, secured to the valve body by screws (not shown).

It is a feature of the invention that a novel seal ring and seal ring mounting are provided on the valve member to effect a seal between the valve member and the body of the valve around the inner ends of the inlet and outlet passages when the valve member is turned to off position. This seal ring, designated 54, is provided on each side of the valve member midway between the ends of the fluid passage 46 therethrough and is generally rectangular as best shown in FIG. 8. The seal ring is characterized by a continuous rib or bead 55 and a relatively thin inwardly extending flange 56. The ring is received in a generally rectangular groove 58 in the periphery of the valve member that includes two parallel, axially extending side sections 59 and two connecting circumferential sections 60. The seal is mounted in place and firmly secured by two keeper plates 61 and suitable screws 62.

The size of each of the seal members is such that it readily encompasses the area of the inner end of the inlet or outlet passage of the valve body and since the rib or bead portion of the seal member projects radially beyond and the exterior surface of the main section 60 of the valve member and engages the surface of the bore 42 in which the valve member is mounted, a seal is effected and yet the valve member can turn relatively freely in the bore since it can be dimensioned to provide clearance between it and the bore. A pair of seal rings 65 are provided in grooves 66 in the body to prevent escape of fluid along the bore 42.

The valve of FIGS. 5–10, while having many applications, is particularly suitable for use in place of conventional and other known so-called line blind valves used in oil refineries and the like to close off and isolate certain feeder or distribution pipes from main and header pipes. Such valves are a necessity in any system where different fluids are carried at different times. It is important that such valves operate easily and without loss of fluid, but so far as I am aware valves presently known and used do not satisfactorily meet these requirements. The problem can be solved by using two of my valves, preferably of the type shown in FIGS. 5–10, but with a slight modification of one valve.

Referring now to FIGS. 11 and 12, which are diagrammatic, numeral 70 designates a relatively large main pipe or ocnduit and numeral 71 a small pipe connected thereto. A valve 72, which is generally similar to the valve of FIGS. 5–10, is shown connected in the pipe or line 71. However this valve is provided with a leakage bleed port 73 in the body 74 in which a small diameter pipe 75 is mounted and leads to a smaller valve 76. The latter is also of the same general construction as the valve of FIGS. 5–10. Pipe 75 leads to the intake passage 77 in body 78 of valve 76 and a line or pipe 80 leads from the outlet passage 81 of the valve to any desired place.

Preferably the valves 72 and 76 are connected to be operated together, and by way of example meshing gear segments 82 and 83 are shown on the valve stems 84 and 85 respectively. The valves are so oriented that when one is open the other is closed. Thus as shown in FIG. 12 the main valve 72 is shown openand the bleeder valve 76 is shown closed. When the main valve is closed, however, in order to avoid any possible leakage past the valve in the line 71 such as might contaminate another type of fluid beyond the valve, the leakage, if any, is bled off through the bleeder pipe 75, valve 76 which is open, and line 80.

I claim:

1. In a valve, the combination of:
a valve body having a valve member receiving bore and having an inlet passage to said bore and an outlet passage from the bore;
a plug valve member in said bore having a fluid passage therethrough from side to side adapted to register with said inlet and outlet passages when said valve member is properly oriented with respect to the body, said valve member having radially reduced end portions journaled in said body,
one of said body and valve member having a seal ring groove encircling the valve member on each side of and axially spaced from said fluid passage through the valve member;
a seal ring in each groove providing a seal between the body and the valve member against fluid escaping from the body axially of the valve member,
said body being formed with a seal ring assembly receiving annular recess in the wall of said bore encircling the inner end of said inlet passage and a corresponding recess encircling said outlet passage; and
a seal ring assembly in each of said recesses constructed and arranged to engage the surface of said valve member, said seal ring asembly including in each case, a plastic seal ring in engagement with said valve member and a resilient backup ring therebehind,
with said plug filling said bore, except for said passages, with no fluid space about said seal ring assemblies, whereby rotation of said plug valve member in said bore provides a wiping of the thin film of fluid between the plug and body by the action of said plastic seal to effect a continuous positive seal.

2. The valve of claim 1 in which said plastic ring is Teflon and in which said resilient ring is formed of material chosen from the class consisting of rubber and synthetic rubber.

3. In a pipe and valve assembly, the combination of:
a main pipe;
a secondary pipe connected to and open to the interior of the main pipe;
a first valve including a valve body and valve member, and connected into and controlling flow through said secondary pipe, said first valve being of the plug valve type and including a pair of endless seals on said valve member constructed and arranged, when the valve is closed, to encompass the fluid passages of the valve respectively, and define a central space between said seals,
said valve body having a leakage bleed port intermediate the fluid passages therethrough and communicating with said central space;
a bleed pipe leading from said bleed port;
a second valve controlling said bleed pipe; and
control means interconnecting said first and second valves for operating said valves in synchronism whereby when one is open the other is closed.

References Cited
UNITED STATES PATENTS

| | | | |
|---|---|---|---|
| 1,322,964 | 11/1919 | Shorts | 137—625.22 |
| 1,800,393 | 4/1931 | Leonard | 251—248X |
| 2,762,601 | 9/1956 | Clade | 251—317X |
| 2,834,369 | 5/1958 | Wheeler | 137—596X |
| 2,839,074 | 6/1958 | Kaiser | 251—317X |
| 3,035,811 | 5/1962 | Hamer | 251—317 |
| 3,101,740 | 8/1963 | Rag | 251—315X |
| 3,216,697 | 11/1965 | Holmberg | 251—317X |
| 3,314,645 | 4/1967 | Temple | 251—317 |

FOREIGN PATENTS

| | | | |
|---|---|---|---|
| 1,038,027 | 5/1953 | France | 251—317 |
| 1,082,550 | 6/1954 | France | 251—317 |

HAROLD W. WEAKLEY, Primary Examiner

U.S. Cl. X.R.

137—596, 627.5; 251—317